United States Patent
Chung et al.

(10) Patent No.: US 11,675,903 B2
(45) Date of Patent: Jun. 13, 2023

(54) APPARATUS FOR DETECTING VARIANTS OF MALICIOUS CODE BASED ON NEURAL NETWORK LEARNING, METHOD THEREFOR AND COMPUTER READABLE RECORDING MEDIUM STORING PROGRAM FOR PERFORMING THE METHOD

(71) Applicant: ESTsecurity Corp., Seoul (KR)

(72) Inventors: Ui Jung Chung, Seoul (KR); Won Kyung Lee, Seoul (KR); Hyeong Jin Byeon, Seoul (KR)

(73) Assignee: ESTsecurity Corp., Seoul (KR)

( * ) Notice: Subject to any disclaimer, the term of this patent is extended or adjusted under 35 U.S.C. 154(b) by 1176 days.

(21) Appl. No.: 16/320,529

(22) PCT Filed: May 24, 2018

(86) PCT No.: PCT/KR2018/005866
§ 371 (c)(1),
(2) Date: Jan. 25, 2019

(87) PCT Pub. No.: WO2018/217019
PCT Pub. Date: Nov. 29, 2018

(65) Prior Publication Data
US 2019/0163904 A1 May 30, 2019

(30) Foreign Application Priority Data
May 24, 2017 (KR) .................. 10-2017-0064301

(51) Int. Cl.
*G06F 21/56* (2013.01)
*G06N 3/084* (2023.01)
(Continued)

(52) U.S. Cl.
CPC .......... *G06F 21/566* (2013.01); *G06F 18/213* (2023.01); *G06F 21/56* (2013.01);
(Continued)

(58) Field of Classification Search
CPC ..... G06F 21/56; G06F 21/566; G06K 9/6232; G06N 3/04; G06N 3/08; G06N 3/084; G06N 3/0454
See application file for complete search history.

(56) References Cited

U.S. PATENT DOCUMENTS 6,952,776 B1 * 10/2005 Chess ................... G06F 21/564
707/999.103
9,705,904 B1 * 7/2017 Davis .................... G06F 21/562
(Continued)

FOREIGN PATENT DOCUMENTS

CN 105989288 A 10/2016
JP 2012-027710 A 2/2012
(Continued)

OTHER PUBLICATIONS

Junlin, Zhang et al., "A Distributional Representation Model For Collaborative Filtering", Feb. 14, 2015, pp. 1-6.
(Continued)

*Primary Examiner* — Solomon G Bezuayehu
(74) *Attorney, Agent, or Firm* — NKL Law; Jae Youn Kim

(57) ABSTRACT

Provides an apparatus for detecting variants of malicious code based on neural network learning, a method therefor and a computer readable recording medium storing a program for performing the method. According to the present invention, one-dimensional binary data is converted into two-dimensional data without separate extraction of features, and deep learning is performed through a neural network having a nonlinear multilayered structure, such that
(Continued)

the features of the malicious code and variants thereof may be extracted by performing the deep learning. Therefore, since no separate feature extraction or artificial effort by an expert is required, an analysis time is reduced, and variants of malicious code that cannot be captured by existing malicious code classification tools may be detected by performing the deep learning.

9 Claims, 8 Drawing Sheets

(51) Int. Cl.
    *G06N 3/04* (2023.01)
    *G06N 3/08* (2023.01)
    *G06F 18/213* (2023.01)

(52) U.S. Cl.
    CPC ............... *G06N 3/04* (2013.01); *G06N 3/08* (2013.01); *G06N 3/084* (2013.01)

(56) References Cited

U.S. PATENT DOCUMENTS

| | | | |
|---|---|---|---|
| 10,133,865 B1* | 11/2018 | Feinman | G06F 21/56 |
| 10,692,004 B1* | 6/2020 | Segev | G06N 3/08 |
| 2003/0099374 A1* | 5/2003 | Choi | H04N 1/32144 382/100 |
| 2007/0294758 A1 | 12/2007 | Berg et al. | |
| 2016/0350532 A1 | 12/2016 | Davis et al. | |
| 2017/0017793 A1* | 1/2017 | Davis | G06F 21/565 |
| 2017/0068816 A1* | 3/2017 | Cavazos | G06F 21/566 |
| 2017/0372071 A1* | 12/2017 | Saxe | H04L 63/1416 |
| 2018/0150724 A1* | 5/2018 | Brock | G06N 20/00 |
| 2018/0183815 A1* | 6/2018 | Enfinger | H04L 63/145 |
| 2018/0285740 A1* | 10/2018 | Smyth | G06N 3/04 |
| 2018/0288086 A1* | 10/2018 | Amiri | G06N 3/082 |
| 2019/0163904 A1* | 5/2019 | Chung | G06F 21/566 |
| 2020/0285893 A1* | 9/2020 | Kim | G06F 18/214 |

FOREIGN PATENT DOCUMENTS

| | | |
|---|---|---|
| JP | 2016-206950 A | 12/2016 |
| KR | 10-20170039951 A | 4/2017 |

OTHER PUBLICATIONS

Sijun Tobiyama et al., "Malware process estimation method by multistage Deep Neural Networks based on process behavior", Deep Neural NetworkMultistage Computer Security Symposium 2016 The Paper Set Said Holding Anti Malware Engineering Workshop 2016 Privacy workshop 2016 Information Processing Society Symposium series vol. 2016 No. 2 [CD-ROM], Japan, Computer Security Research Institute, Computer Security Research Institute, vol. 2016, pp. 310 to 317, Oct. 4, 2016, p. 1.

Mishima et al., "Malware classification system based on behavior and visualization of malware" using malware behavior information, and FIT 2016Fifteenth Information Scientific Technology, fourth Division, Article A, General Documentary Network Security partnership, Technical information systems, Aug. 23, 2016, pp. 157 to 158.

Haga Toshiyuki et al., "Attack Detection System for In-vehicle with Machine Learning", Panasonic Technical Report, Japan, May 15, 2017, vol. 63 No. 1,pp. 16-21.

Takei Hirosho, First edition, first edition of deep learning, Mar. 4, 2016, first edition, p. 23 26 77 78 88 89.

\* cited by examiner

APPARATUS FOR DETECTING VARIANTS OF MALICIOUS CODE BASED ON NEURAL NETWORK LEARNING, METHOD THEREFOR AND COMPUTER READABLE RECORDING MEDIUM STORING PROGRAM FOR PERFORMING THE METHOD

TECHNICAL FIELD

The present invention relates to a technique for detecting variants of malicious code, and more particularly, to an apparatus for detecting variants of malicious code based on neural network learning, a method therefor and a computer readable recording medium storing a program for performing the method.

BACKGROUND ART

A malicious code refers to all software that are made for malicious purposes and adversely affect computers. In a case of using the existing signature-based detection methods, or static or dynamic analysis methods, it is difficult to cope with rapidly increasing variants of malicious code. That is, when detecting the malicious code using the existing methods, it is difficult to cope with variants of malicious code because the malicious code is detected in a way of manual analysis and signature generation. Further, in the existing methods, variants of malicious code may be easily generated and propagated using a malicious tool that automatically creates malicious codes. In a case of the existing static analysis method for statically detecting the malicious code, it is difficult to complexly reflect features of data because features of the malicious code are arbitrarily extracted and analyzed by a human from an executable file of the malicious code or disassembled codes thereof.

SUMMARY of INVENTION

Problems to be Solved by Invention

It is an object of the present invention to provide an apparatus capable of detecting variants of malicious code included in data based on neural network learning, a method therefor and a computer readable recording medium storing a program for performing the method.

Means for Solving Problems

In order to achieve the above-described object, a cording to an aspect of the present invention, there is provided an apparatus for detecting variants of malicious code, including: a neural network including an input layer which includes a two-dimensional matrix of which one element is a unit of data processing, a hidden layer which includes a plurality of layers including a plurality of operations, wherein any one of operation results of any one of the plurality of layers is provided to and used in an operation of a subsequent layer as an input by giving weights, and an output layer which includes a plurality of nodes; a data conversion unit configured to, when data including one-dimensional binary codes is input, convert the data fit to the matrix of the input layer; and a detection unit configured to, when the data is suspicious data, provide the suspicious data to the neural network as an input, extract and classify features of the previously-learned malicious code from the suspicious data through the neural network, and detect a category of the malicious code included in the suspicious data.

The data conversion unit may convert the one-dimensional binary codes into two-dimensional vector sequences by dividing the binary codes into each integer multiple having a word size used in an architecture.

The data conversion unit may generate pixels by dividing the one-dimensional binary codes into pixel units, and generate image using the pixels generated to fit a size of the matrix of the input layer.

The apparatus for detecting variants of malicious code according to an embodiment of the present invention may further include: a learning unit configured to, when the converted data is learning data, provide the learning data to the neural network as an input, and correct the weight by using backpropagation algorithms so that output values output by performing a plurality of operations on the neural network are an expected value which represents a known malicious code category of the learning data.

The hidden layer may include: convolution layers which include a plurality of feature maps to which the suspicious data is mapped, and are configured to extract features of the malicious code included in the suspicious data by performing operations with a kernel; pooling layers which include a plurality of feature maps to which features of the extracted malicious code are mapped corresponding to the convolution layers, and are configured to perform down sampling of the features of the malicious code by performing operations with the kernel; and a fully-connected layer which includes a plurality of nodes each representing the features of the malicious code.

In order to achieve the above-described object, according to another aspect of present invention, there is provided a method for detecting variants including: by the data conversion unit, when input data including one-dimensional binary codes is input, converting the data fit to a two-dimensional matrix having a predetermined size, of which one element is a unit of data processing; and when the data is suspicious data, extracting features of the malicious code from the suspicious data, which are previously-learned through the neural network, and detecting a category of the malicious code included in the suspicious data.

The converting step may include: converting, by the data conversion unit, input data including one-dimensional binary sequences into two-dimensional vector sequences by dividing the binary sequences of the input data into each integer multiple having a word size used in an architecture.

The converting step may include: generating pixels by dividing the one-dimensional binary codes into pixel units, and converting the binary codes of the data into an image to fit the matrix using the generated pixels.

The above method may further include: after the converting step, when the data is learning data, by a learning unit, providing the learning data to the neural network as an input, and correcting the weight so that output values output by performing a plurality of operations on the neural network are an expected value which represents the category of the known malicious code of the learning data.

The detecting step may include: extracting features of the malicious code included in the suspicious data by performing operations between a feature map to which the suspicious data is mapped and a kernel; mapping features of the extracted features of the malicious code to a plurality of nodes each representing the features of the malicious code; and mapping the mapped features of the malicious code to a plurality of nodes each representing a category of the malicious code to output the same.

Further, according to another aspect of the present invention, there is provided a computer readable recording medium storing a program for performing the method for detecting variants of malicious code according to the preferred embodiment of the present invention.

Advantageous Effects

According to the present invention, one-dimensional binary data is converted into two-dimensional data without separate extraction of features, and deep learning is performed through a neural network having a nonlinear multi-layered structure, such that the features of the malicious code and variants thereof may be extracted by performing the deep learning. Therefore, since a separate feature extraction tool or artificial effort by an expert is not required, an analysis time is reduced, and variants of malicious code that cannot be captured by the existing malicious code classification tools may be detected by performing the deep learning.

MODE FOR CARRYING OUT INVENTION

Figure 1:
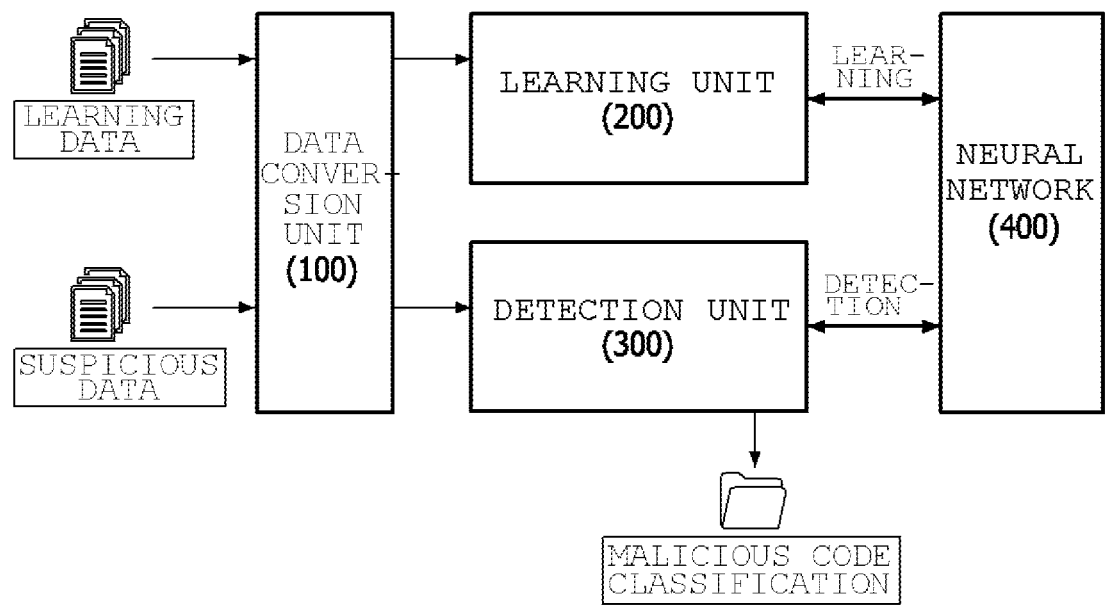
FIG. 1 is a block diagram illustrating a configuration of an apparatus for detecting variants of malicious code based on neural network learning according to an embodiment of the present invention.

In order to achieve the above-described object, according to an aspect of the present invention, there is provided an apparatus for detecting variants of malicious code, including: a neural network including an input layer which includes a two-dimensional matrix of which one element is a unit of data processing, a hidden layer which includes a plurality of layers including a plurality of operations, wherein any one of operation results of any one of the plurality of layers is provided to and used in an operation of a subsequent layer as an input by giving weights, and an output layer which includes a plurality of nodes; a data conversion unit configured to, when data including one-dimensional binary codes is input, convert the data fit to the matrix of the input layer; and a detection unit configured to, when the data is suspicious data, provide the suspicious data to the neural network as an input, extract and classify features of the previously-learned malicious code from the suspicious data through the neural network, and detect a category of the malicious code included in the suspicious data.

The data conversion unit may convert the one-dimensional binary codes into two-dimensional vector sequences by dividing the binary codes into ach integer multiple having a word size used in an architecture.

The data conversion unit may generate pixels by dividing the one-dimensional binary codes into pixel units, and generate an image using the pixels generated to fit a size of the matrix of the input layer.

The apparatus for detecting variants of malicious code according to an embodiment of the present invention may further include: a learning unit configured to, when the data is learning data, provide the learning data to the neural network as an input, and correct the weight by using backpropagation algorithms so that output values output by performing a plurality of operations on the neural network are an expected value which represents a known malicious code category of the learning data.

The hidden layer may include: convolution layers which include a plurality of feature maps to which the suspicious data is mapped, and are configured to extract features of the malicious code included in the suspicious data by performing operations with a kernel; pooling layers which include a plurality of feature maps to which features of the extracted malicious code are mapped corresponding to the convolution layers, and are configured to perform down sampling of the features of the malicious code by performing operations with the kernel; and a fully-connected layer which includes a plurality of nodes each representing the features of the malicious code.

In order to achieve the above-described object, according to another aspect of the present invention, there is provided a method for detecting variants including: by the data conversion unit, when input data including one-dimensional binary codes is input, converting the data fit to a two-dimensional matrix having a predetermined size, of which one element is a unit of data processing; and when the data is suspicious data, extracting features of the malicious code from the suspicious data, which are previously-learned through the neural network, and detecting a category of the malicious code included in the suspicious data.

The converting step may include: converting, the data conversion unit, input data including one-dimensional binary sequences into two-dimensional vector sequences by dividing the binary sequences of the input data into each integer multiple having a word size used in an architecture.

The converting step may include: generating pixels by dividing the one-dimensional binary codes into pixel units, and converting the binary codes of the data into an image to fit the matrix using the generated pixels.

The above method may further include: after the converting step, when the data is learning data, by a learning unit, providing the learning data to the neural network as an input, and correcting the weight so that output values output by performing a plurality of operations on the neural network are an expected value which represents the category of the known malicious code of the learning data.

The detecting step may include: extracting features of the malicious code included in the suspicious data by performing operations between a feature map to which the suspicious data is mapped and a kernel; mapping features of the extracted features of the malicious code to a plurality of nodes each representing the features of the malicious code; and mapping the mapped features of the malicious code to a plurality of nodes each representing a category of the malicious code to output the same.

Further, according to another aspect of the present invention, there is provided a computer readable recording medium storing a program for performing the method for detecting variants of malicious code according to the preferred embodiment of the present invention.

Prior to the detailed description of the present invention, terms or words used in the specification and claims should not be as limited to a conventional or lexical mean and should be understood as appropriate notions by the inventor based on that he/she is able to define terms to describe his/her invention in the best way to be seen by others. Therefore, embodiments described herein and configurations illustrated in the drawings are the most preferable embodiment of the present invention and not exhaustive in terms of the technical idea of the present invention, and it will be understood that various modifications and equivalents may be made to take the place of the embodiments at the application point of the present invention.

Hereinafter, the present invention will be described in detail with reference to the accompanying drawings. Referring to the drawings, wherein like reference characters designate like or corresponding parts throughout the several views. In the embodiments of the present invention, the publicly known functions and configurations that are judged to be able to make the purport of the present invention unnecessarily obscure will not be described. For the same reason, some of the components in the accompanying drawings are exaggerated, omitted, or schematically illustrated, and the size of each component does not entirely reflect the actual size thereof.

Figure 2:
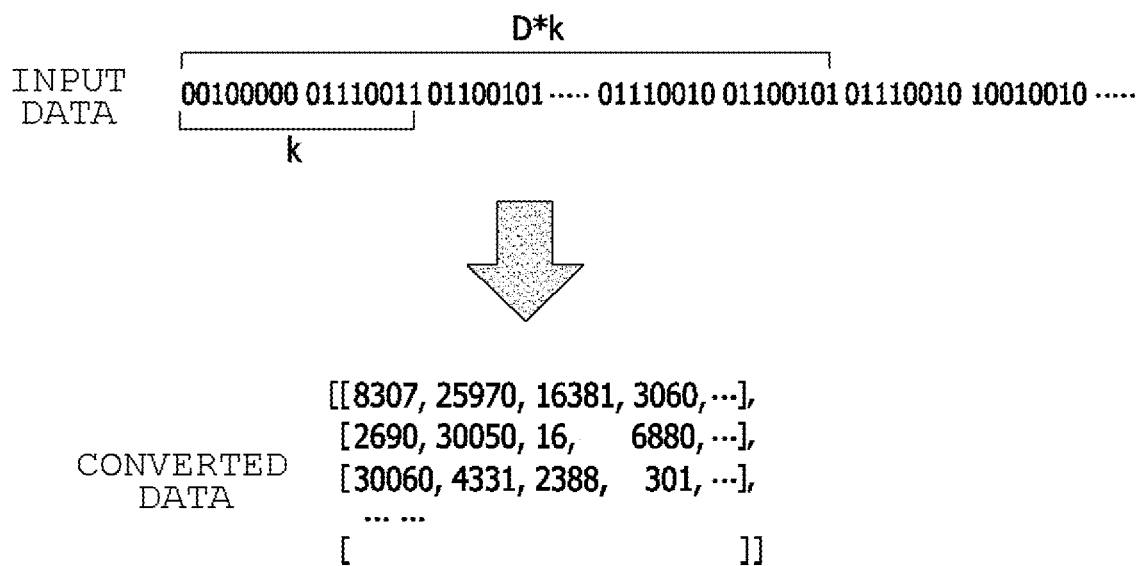
FIG. 2 is a diagram for describing an operation of a data conversion unit according to the embodiment of the present invention.
Figure 3:
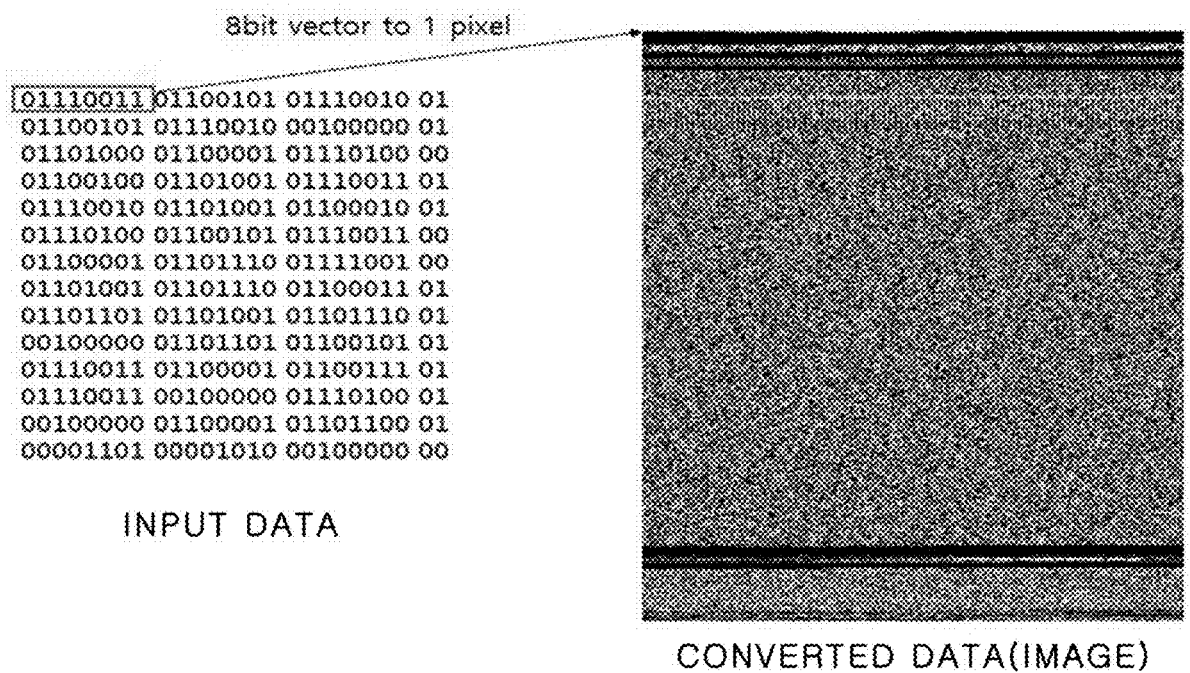
FIG. 3 is a diagram for describing an operation of a data conversion unit according to another embodiment of the present invention.
Figure 4:
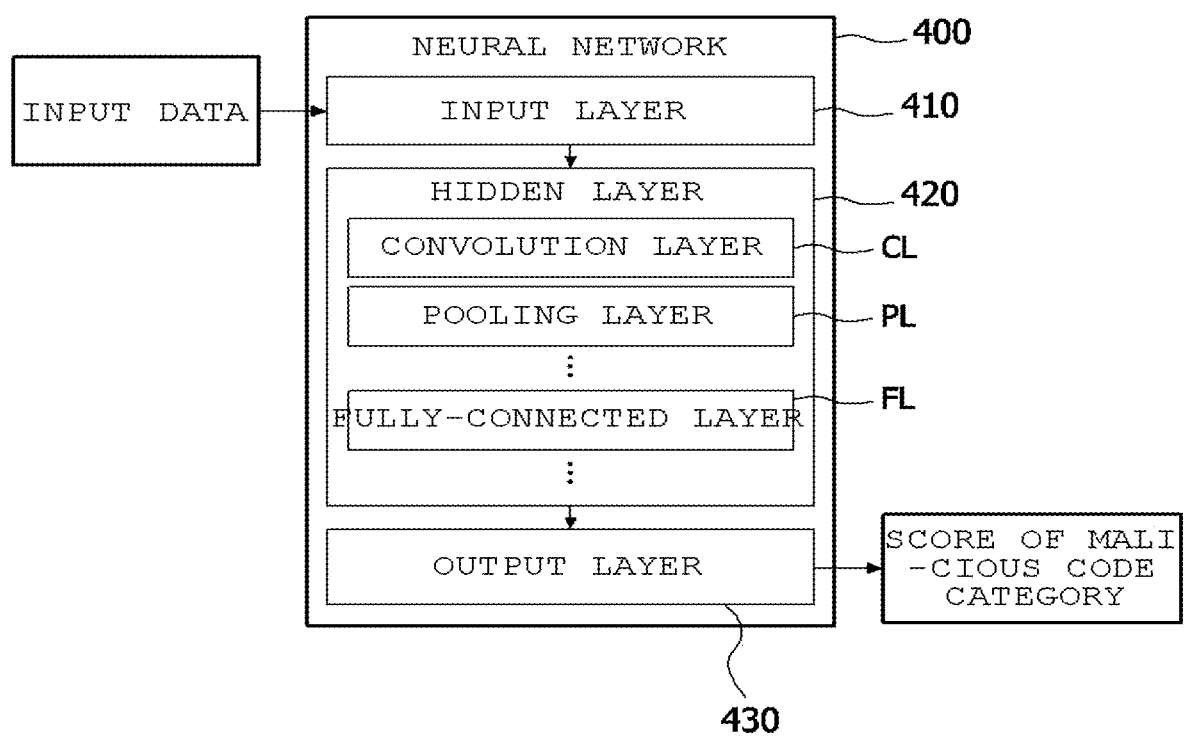
FIG. 4 is a block diagram illustrating a configuration f a neural net cork for detecting variants of malicious code based on neural network learning according to the embodiment of the present invention.
Figure 5:
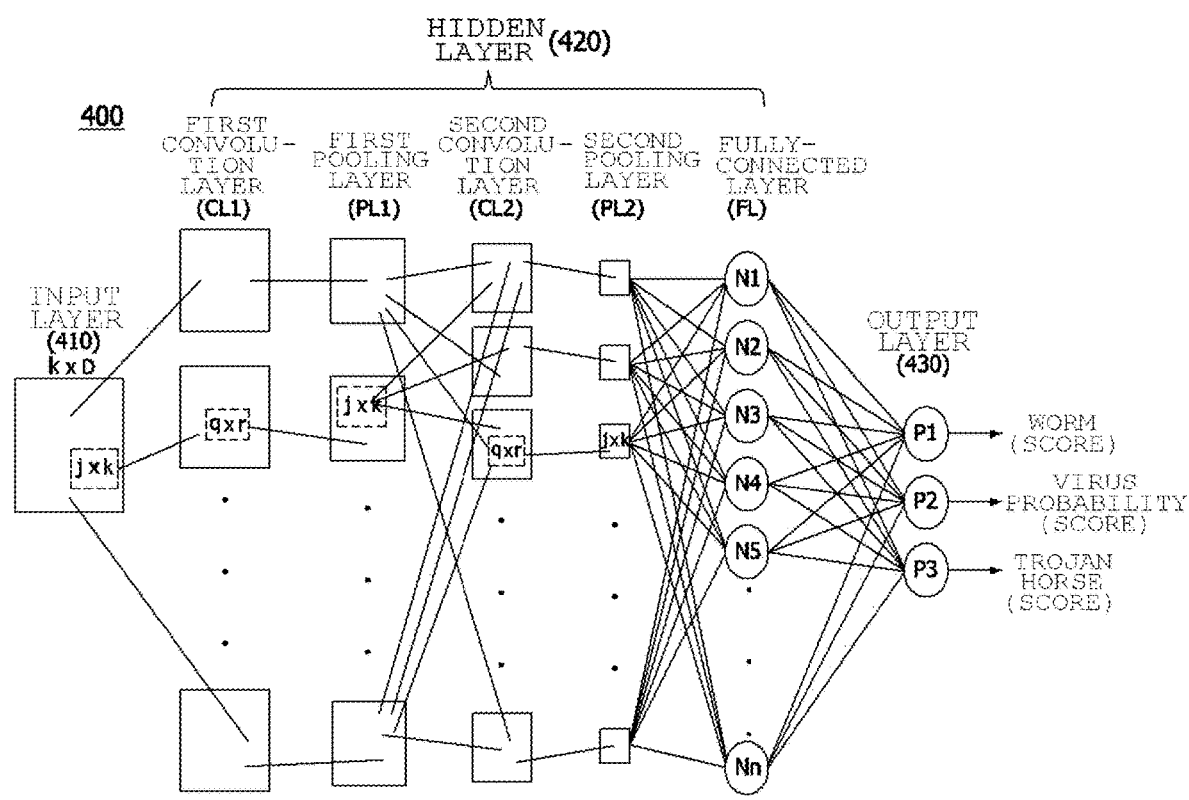
FIG. 5 is a diagram for describing an internal structure and concept of the neural network according to the embodiment of the present invention.

First, an apparatus for detecting variants of malicious code based on neural network learning according to an embodiment of the present invention will be described. FIG. 1 is a block diagram illustrating a configuration of an apparatus for detecting variants of malicious code based on neural network learning according to the embodiment of the present invention, FIG. 2 is a diagram for describing an operation of a data conversion unit according to the embodiment of the present invention, FIG. 3 is a diagram for describing an operation of a data conversion unit according to another embodiment of the present invention. FIG. 4 is a block diagram illustrating a configuration of a neural network for detecting variants of malicious code based on neural network learning according to the embodiment of the present invention, and FIG. 5 is a diagram for describing an internal structure and concept of the neural network according to the embodiment of the present invention.

Referring to FIG. 1, the apparatus for detecting variants of malicious code based on neural network learning (hereinafter, abbreviated to a "malicious code detection apparatus") according to the embodiment of the present invention includes a data conversion unit 100, a learning unit 200, a detection unit 300 and a neural network 400. Herein, the neural network 400 includes a plurality of layers including an input layer 410, a hidden layer 420 and an output layer 430. In particular, the plurality of layers of the neural network 400 formed by a plurality of operations, wherein any one operation of any one layer among the plurality of layers is provided to and used in at least one operation of the subsequent layer as an input by giving a weight W. Thereby, the neural network may have a nonlinear multilayered structure including a plurality of nonlinear layers by these operations and weights.

The input layer 410 of the neural network 400 includes a two-dimensional matrix of which one element is a unit of data processing. When data, which is one of learning data and suspicious data, is input, the data conversion unit 100 converts the input data to fit a standard of the neural network 400. That is, the input data includes one-dimensional binary codes, and the data conversion unit 100 converts the one-dimensional binary codes to fit the two-dimensional matrix of which one element is a unit of data processing.

According to the embodiment described with reference FIG. 2, when the data is input, the data conversion unit 100 combines binary codes, that is, binary sequences of the input data, into each k-bit and reads them as a single value. Then, the data conversion unit 100 converts the one-dimensional binary codes (binary sequences) read by k bits into two-dimensional vector sequences having a D size. Herein, k*D is an integral multiple of a word size used in an architecture. In other words, the data conversion unit 100 embeds the irregular codes into two-dimensional vector sequences formatted in a size of k*D. Thereafter, the data conversion unit provides data (learning data or suspicious data) embedded into the two-dimensional vector sequences to the learning unit 200 or the detection unit 300.

According to the embodiment described with reference to FIG. 3, when the data is input, the data conversion unit 100 generates pixels by dividing the binary codes of the input data into pixel units (00000000: black to FFFFFFFF: white). For example, the binary codes of the input data are combined in 8-bit units to be represented as one pixel by the data conversion unit. Thereafter, the data conversion unit 100 generates an image using pixels generated to fit a size of the matrix of the input layer 410. That is, the data conversion unit 100 generates an image having the same ratio as a row-column ratio of the matrix of the input layer 410. As described above, according to another embodiment of the present invention, an image to fit the standard of the input layer 410 is generated by converting the binary codes. At this time, since the executable files have different sizes for each malicious code, the data conversion unit 100 fixes a horizontal length of the image in proportion to the size of the executable file, so as to appropriately maintain an aspect ratio of the image. In particular, since the sizes of data (learning data and suspicious data) represented by the image are different from each other, the data converting unit 100 may adjust the size of the image through padding, cropping, resizing, and the like in order to fit the stand of the input layer 410. Thereafter, the data converting unit provides the data (learning data or suspicious data) converted into a two-dimensional image to the learning unit 200 or the detection unit 300 as an input.

When the learning data is input from the data conversion unit 100, the learning unit 200 provides the learning data to the neural network 400 as an input to perform deep learning on the neural network 400.

The neural network 400 includes a plurality of layers, each of which includes a plurality of operations.

The operation result obtained in any one operation of any one layer among the plurality of layers is provided to and used in at least one operation of the subsequent layer as an input by giving a weight W.

The learning unit 200 provides the learning data to the neural network 400 as an input, and the neural network 400 calculates the weight W so that the final operation result according to the operations performed through a plurality of nodes in the plurality of layers represents categories of the malicious codes of the learning data. As described above, a process of calculating the weight W is referred to as 'deep leaning' in the present disclosure.

When the suspicious data is input from the data conversion unit 100, the detection unit 300 provides the suspicious data to the neural network 400 as an input and detects the categories of the malicious codes included in the suspicious data through the neural network 400. That is, the detection unit 300 detects the categories of the malicious codes through the neural network 400 and outputs the categories of the detected malicious codes.

As described above, the neural network 400 includes a plurality of layers including a plurality of operations. Hereinafter, the neural network 400 will be described in more detail. Referring to FIG. 4, the neural network 400 includes the input layer 410, the hidden layer 420, and the output layer 430.

The input layer 410 is a layer to which the above-described learning data or suspicious data is input. The input layer 410 may be a two-dimensional matrix having a predetermined size, and one element of the two-dimensional matrix may be an integral multiple of the word size which is a unit of data processing of the architecture according to one embodiment. Alternatively, according to another embodiment, one element of the two-dimensional matrix may be a pixel.

The hidden layer 420 is a layer configured to perform deep learning of the features of the malicious code according to the learning data or perform operations according to the results of the deep learning, thereby classifying and extracting the features of the malicious code included in the suspicious data.

The hidden layer 420 includes the predetermined number of convolution layers CL, pooling layers PL and fully connected layers FL, which are alternately repeated.

For example, as illustrated in FIG. 5, the hidden layer may include first and second convolution layers CL1 and CL2 and first and second pooling layers PL1 and PL2, The convolution layers CL (CL1 and CL2) and the pooling layers PL (PL1 and PL2) include feature maps having a predetermined size. Each element forming the feature map is calculated by performing operations, that is, convolution operations and/or pooling or subsampling operations, with a kernel having a predetermined size. In FIG. 5, the feature maps are illustrated by solid rectangles, and the kernels are illustrated by dotted rectangles.

Figure 6:
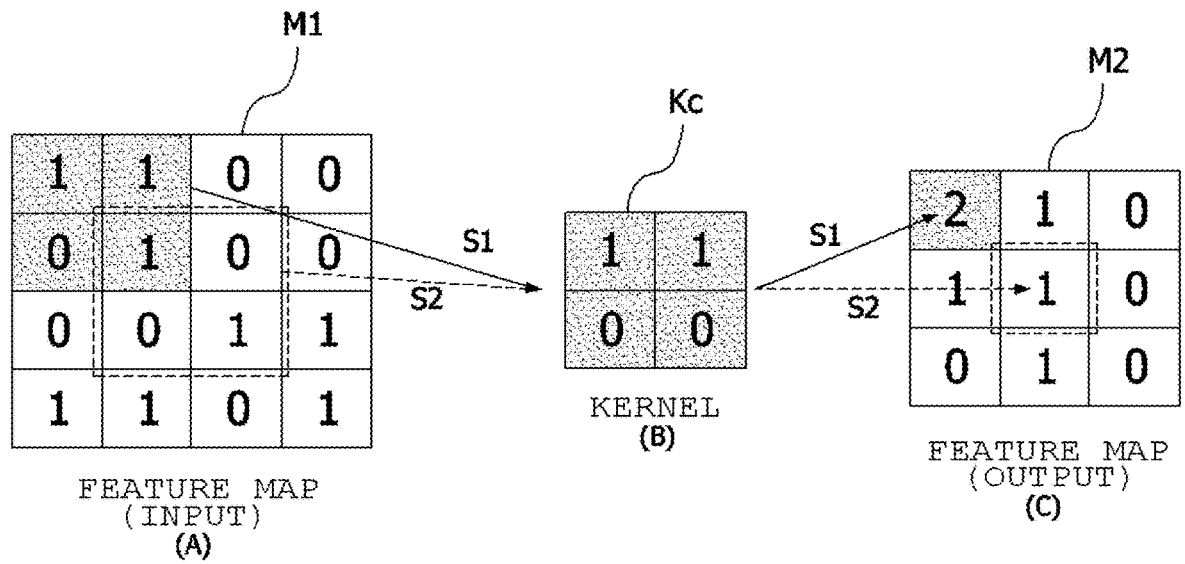
FIG. 6 is a diagram for describing an example of a convolution operation using a kernel Kc according to the embodiment of the present invention.

Each element forming the feature map of the convolution layers CL1 and CL2 is calculated by performing convolution operations using the kernel having a predetermined size. The kernel Kc used in the convolution operation is a parameter for extracting features of a plurality of malicious codes which are different from each other. In order to extract the features of a plurality of malicious codes which are different from each other, elements included in the kernel Kc which are different from each other have different values. FIG. 6 is a diagram for describing an example of the convolution operation using the kernel Kc according to the embodiment of the present invention. As illustrated in FIG. 6, the neural network generates a new feature map M2 of an output by performing convolution operations between a feature map M1 of an input and the kernel Kc. Herein, it is assumed that the input feature map M1 has a size of 4×4 as illustrated in FIG. 6(A), and the kernel Kc has a size of 2×2 as illustrated in FIG. 6(B). In this case, the kernels Kc serve as the weights W in the convolution operation.

As described above, the neural network performs convolution operations between the input feature map having a size of 4×4 and the kernel having a size of 2×2 to generate an output feature map having a size of 3×3, as illustrated in FIG. 6(C). Specifically, the neural network performs convolution operations between elements included in the input feature map and elements included in the kernel corresponding thereto while shifting the kernel Kc at a predetermined interval. More specifically, the convolution operation is performed by multiplying the elements of the input feature map by the elements of the kernel Kc corresponding thereto, and then accumulating the multiplication results ('multiplication-accumulation operation'), As an example, an element (1, 1) of the output feature map M2 is calculated by performing a first operation S1. That is, as a result of the first operation S1, the element (1, 1) of the output feature map M2 is calculated by performing a multiplication-accumulation operation as the following Equation 1.

$$(1 \times 1)+(1 \times 1)+(0 \times 0)+(1 \times 0)=2 \qquad \text{[Equation 1]}$$

In addition, another element (2, 2) of the output feature map M2 is calculated by performing a second operation S2. That is, as a result of the second operation S2, the element (2, 2) of the output feature map M2 is calculated by performing the multiplication-accumulation operation as the following Equation 2.

$$(1 \times 1) \pm (0 \times 1) \pm (0 \times 0) \pm (1 \times 0)=1 \qquad \text{[Equation 2]}$$

Figure 7:
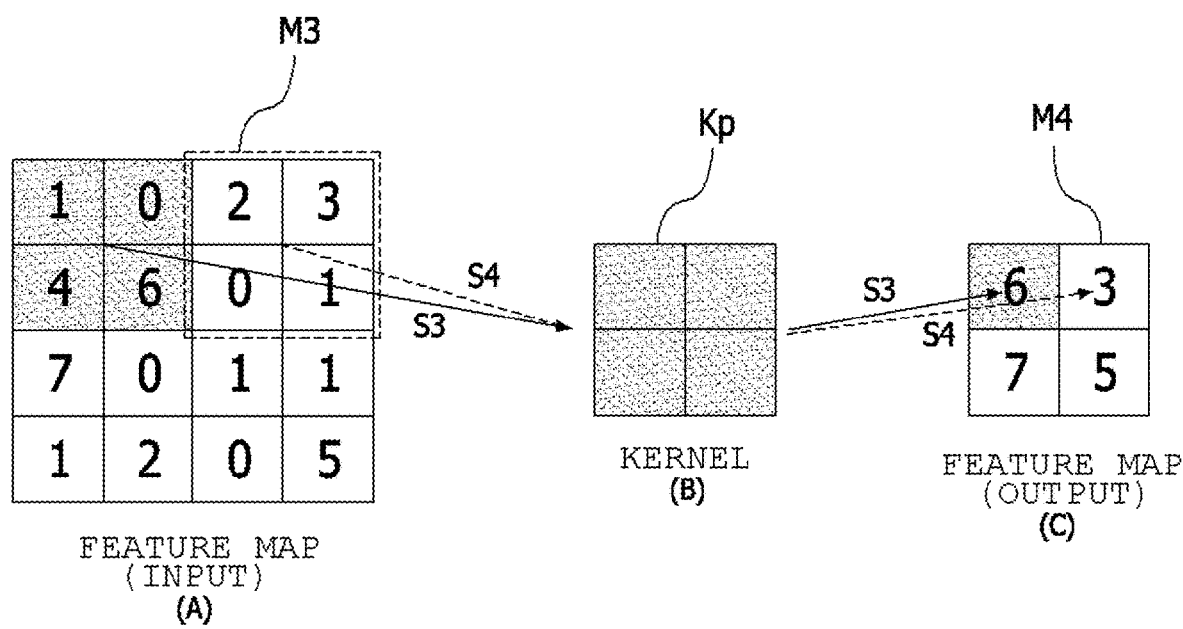
FIG. 7 is a diagram for describing an example of a pooling operation according to the embodiment of the present invention.

As described above, the neural network performs a pooling operation on the feature map generated through the convolution operations. That is, each element forming the feature maps of the pooling layers PL1 and PL2 is calculated by performing pooling or subsampling operations using a kernel having a predetermined size. A kernel Kp used in the pooling operation is a parameter for down sampling the features of a plurality of malicious codes. FIG. 7 is a diagram for describing an example of the pooling operation according to the embodiment of the present invention. As illustrated in FIG. 7, the neural network generates a new feature map M4 of an output by performing pooling operations between a feature map M3 of an input and the kernel Kc. Herein, it is assumed that the input feature map M3 has a size of 4×4 as illustrated in FIG. 7(a), and the kernel Kc has a size of 2×2 as illustrated in FIG. 7(b). As described above, the neural network performs pooling operations between the input feature map having a size of 4×4 and the kernel having a size of 2×2 to generate an output feature map having a size of 2×2, as illustrated in FIG. 7(c).

Specifically, the neural network performs pooling operations between elements included in the input feature map and elements included in the kernel corresponding thereto while shifting the kernel Kp at a predetermined interval. In this embodiment, it is assumed that the pooling operation is performed while shifting the kernel Kp at a predetermined interval relative to the size of the kernel. In particular, the pooling operation may be any one of operations for selecting a maximum value, an average value, an intermediate value, and a norm value. In this embodiment, it is assumed that the output feature map is calculated by performing a pooling operation to select a maximum value. As an example, an element (1, 1) of the output feature map M4 is calculated by performing a third operation S3. That is, as a result of the third operation S3, the element (1, 1) of the output feature map M4 is calculated by performing the pooling operation to select a maximum value as the following Equation 3.

$$\text{Max}(1,0,4,6)=6 \qquad \text{[Equation 3]}$$

As another example, another element (1, 2) of the output feature map M4 is calculated by performing a fourth operation S4. That is, as a result of the fourth operation S4, the element (1, 2) of the output feature map M4 is calculated by performing the pooling operation to select a maximum value as the following Equation 4.

$$\text{Max}(2,3,0,1)=3 \qquad \text{[Equation 4]}$$

As described above, when performing operations of the convolution layers CL and the pooling layers PL, the number of feature maps is increased, and the number of elements forming the feature map is decreased.

The fully-connected layer FL is a layer in which all the elements of the feature map are fully connected as a single value. This state is typically referred to as a fully connected state.

The fully-connected layer FL includes a plurality of nodes and is configured to classify and extract the features of the malicious codes extractable from the data. Thus, each of the plurality of nodes of the fully-connected layer FL represents the features of the malicious codes which are different from each other. In addition, each node has its own operation. In the embodiment of FIG. 5, n nodes N1, N2, N3, . . . and Nn are illustrated.

The respective nodes N1, N2, N3, . . . and Nn receive the operation results of the previous layer connected thereto as an input to perform operations, and output the operation results to nodes P1, P2, and P3 of the subsequent layer corresponding thereto.

Figure 8:
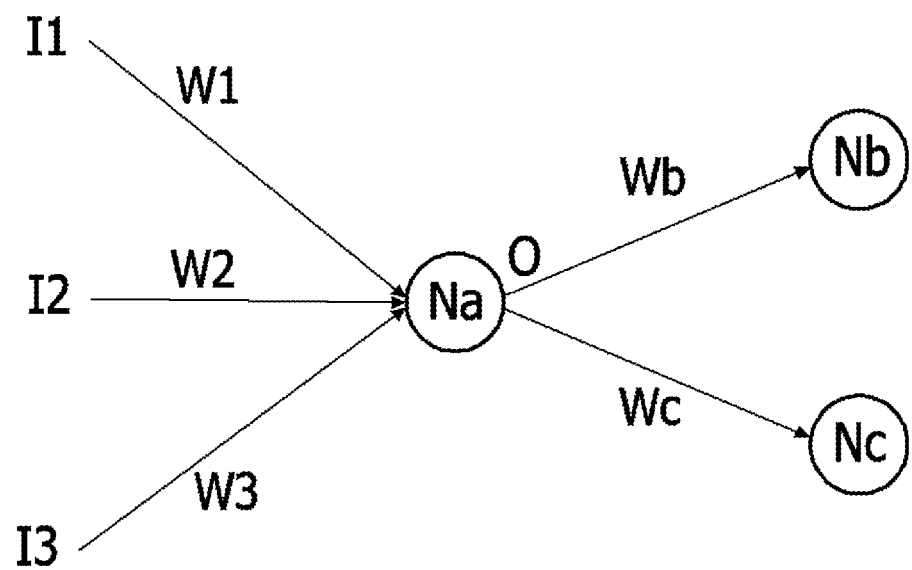
FIG. 8 is a diagram for describing an operation of a node in which weights are given according to the embodiment of the present invention.

FIG. 8 is a diagram for describing a process of operating a node in which weights are given according to the embodiment of the present invention. As illustrated in FIG. 8, any one node Na of the nodes receives outputs of the corresponding node of the previous layer as an input to perform operations, and then outputs the operation results. When the output of the previous layer is input to the subsequent layer, weights W are given to the node. That is, as illustrated in FIG. 8, an input of the node Na is a value obtained by multiplying first to third outputs I1, I2 and I3, which are the operation results of each of three nodes of the previous layer, by first to third weights W1, W2 and W3 respectively, and accumulating the multiplication results. That is, the input to the node Na is obtained by performing the multiplication-accumulation operation as the following Equation 5.

$$(I1 \times W1)+(I2 \times W2)+(I3 \times W3) \qquad \text{[Equation 5]}$$

Also, an output O of the node Na is provided to a node of the subsequent layer by giving weights corresponding thereto. For example, as illustrated in FIG. 8, when the output of the node Na is input to a node Nb, the output is provided having a weight Wb given thereto, and when the output of the node Na is input to a node Nc, the output is provided having a weight Wc given thereto.

The output of the fully connected layer FL is input to the output layer 430, and is mapped to the fully connected layer FL through the weight W. The respective nodes of the output layer 430 correspond to categories of malicious codes. The respective outputs of the nodes of the output layer 430 may be a score that indicates a probability in which the learning data or the suspicious data input to the neural network 400 is a malicious code category. For example, the respective nodes P1, P2 and P3 of the output layer 430 in FIG. 4 correspond to malicious code categories 1, 2 and 3, and the respective outputs of the nodes P1, P2 and P3 indicate the probabilities in which the learning data or the suspicious data are malicious code categories 1, 2 and 3.

Thereby, the detection unit 300 may provide suspicious data to the neural network 400 as an input, and determine that the malicious code included in the suspicious data belongs to malicious code category based on a final output value of the neural network 400, that is, the respective outputs of the nodes of the output layer 430.

For example, if the output of any one of the nodes P1, P2, and P3 is a predetermined value or more and has a higher value than the remaining two nodes, the detection unit 300 may determine that the malicious code included in the input suspicious data belongs to the category of malicious code corresponding to the node.

Figure 9:
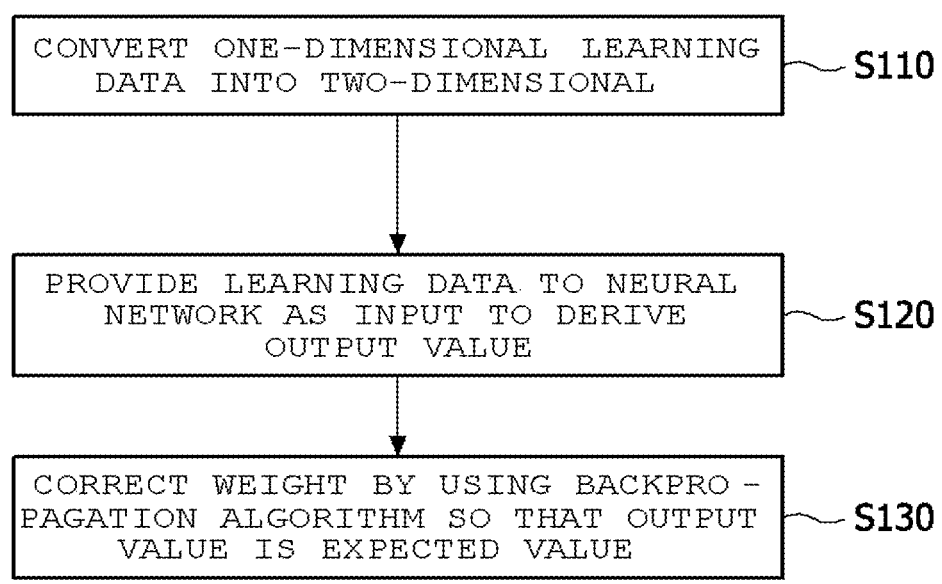
FIG. 9 is a flowchart for describing a method for learning a malicious code according to the embodiment of the present invention.

Next, a method for learning a malicious code according to the embodiment of the present invention will be described. FIG. 9 is a flowchart for describing the method for learning a malicious code according to the embodiment of the present invention.

When learning data is input, the data conversion unit 100 converts the learning data including one-dimensional binary codes to fit a matrix of the input layer 410 of the neural network 400 in step S110. According to one embodiment, the data conversion unit 100 converts the one-dimensional binary codes into two-dimensional vector sequences by dividing the binary codes into each integral multiple having a word size used in the architecture, and provides the converted vector sequences to the learning unit 200 as an input. According to another embodiment, the data conversion unit 100 generates pixels by dividing the one-dimensional binary codes into pixel units, converts the binary codes into an image having the same size as the row-column ratio of the matrix of the input layer 410 using the generated pixels, and provides the converted image to the learning unit 200 as an input.

Next, in step S120, the learning unit 200 provides the learning data converted in the previous step to the neural network 400 as an input to derive output values of the neural network 400. At this time, the neural network 400 derives output values by performing plural operations in a plurality of layers on the learning data.

Herein, any one of operation results of any one of the plurality of layers is provided to and used in the operation of the subsequent layer as an input by giving weights.

The learning data includes a malicious code whose malicious code category is known. Therefore, when the learning data is input, it is expected that an output of the neural network 400, that is, an output value of the output layer 430 of the neural network 400, represents the known malicious code category of the learning data. As described above, the output value, which represents the known malicious code category of the learning data when the learning data is input to the neural network 400, is referred as an 'expected value' in the present disclosure. Accordingly, in step S130, the learning unit 200 corrects the weight by using backpropagation algorithms so that the output value is the expected value, or a difference between the output value and the expected value is minimized. For example, as illustrated in FIG. 5, it is assumed that the output layer 430 includes the nodes P1, P2, and P3, each of which represents first to third categories of malicious codes. Also, it is assumed that the input learning data includes malicious codes belonging to the third category. The output values of the respective first to third categories are scores indicating a probability that the learning data input to the neural network 400 belongs to the first to third categories. Therefore, the learning unit 200 corrects the weight through the backpropagation algorithms so that the output value of the node P3 of the output layer 430 is maximized. It is preferable that the above-described steps S110 to S130 are repeatedly performed until "sufficient deep learning is performed" using a plurality of learning data. In the present disclosure, the wording "until sufficient learning is performed" means that, when arbitrary learning data is input, the difference between the output value and the expected value is less than a predetermined value.

Figure 10:
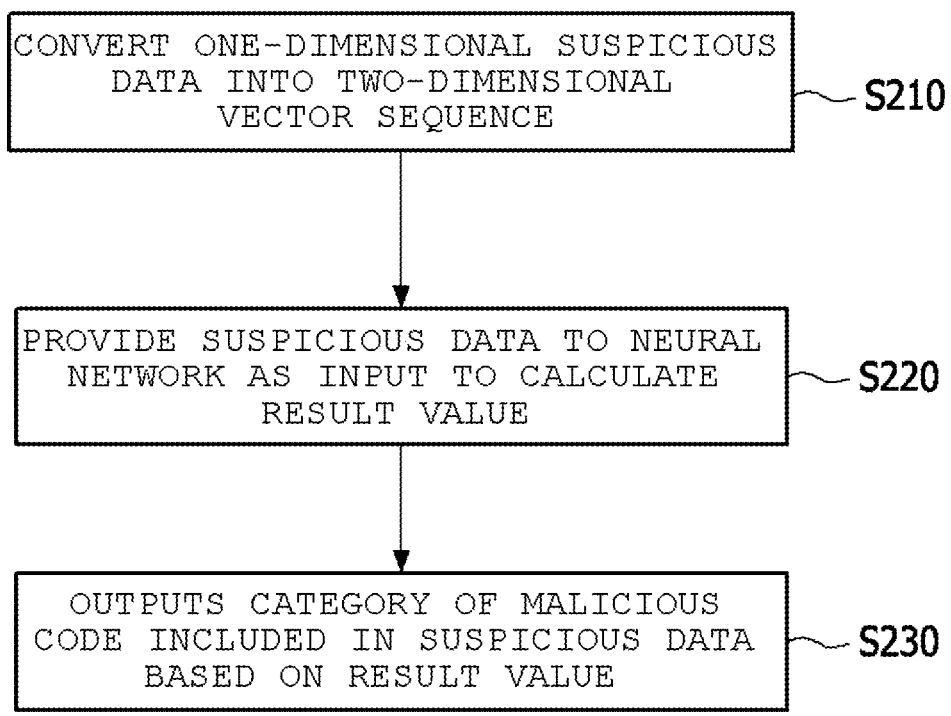
FIG. 10 is a flowchart for describing a method for detecting variants of malicious code based on the neural network learning according to the embodiment of the present invention.

Hereinafter, a method for detecting variants of malicious code through the neural network 400 which has been sufficiently subjected to deep learning through the above-described learning method will be described. FIG. 10 is a flowchart for describing a method for detecting variants of malicious code based on neural network learning according to the embodiment of the present invention.

Referring to FIG. 10, when suspicious data is input, the data conversion unit 100 converts the suspicious data including one-dimensional binary codes to fit the matrix of the input layer 410 of the neural network 400 in step S210. According to one embodiment, as illustrated in FIG. 2, the data conversion unit 100 converts the one-dimensional binary codes into two-dimensional vector sequences by dividing the binary codes into each integer multiple having a word size used in the architecture, and provides the converted vector sequences to the detection unit 300 as an input. According to another embodiment, as illustrated in FIG. 3, the data conversion unit 100 generates pixels by dividing the binary codes into pixel units, converts the binary codes into an image having the same size as the row-column ratio of the matrix of the input layer 410 using the generated pixels, and provides the converted image to the detection unit 300 as an input.

Next, in step S220, the detection unit 300 provides the suspicious data converted in the previous step to the neural network 400 as an input to derive output values of the neural network 400. At this tune, the neural network 400 calculates output values by performing plural operations in a plurality of layers on the suspicious data.

Herein, any one of operation results of any one of the plurality of layers is provided to and used in the operation of the subsequent layer as an input by giving the previously-learned weights. A procedure, for deriving the output value will be described in more detail. When suspicious data is input to the input layer 410 of the neural network 400, the convolution layer CL and the pooling layer PL of the hidden layer 420 classify and extract the features of the malicious code included in the suspicious data by giving the previously-learned weights in operations of the input suspicious data performed between the feature map and the kernel K. Thereafter, the features of the malicious code extracted from the convolution layer CL and the pooling layer PL, are mapped to corresponding nodes that represent the features of the malicious code of the fully-connected layer FL through the previously-learned weights. Then, the fully connected layer FL maps the mapped features of the malicious code to the corresponding node that represents the category of the malicious codes of the output layer 430 through the previously-learned weights. Subsequently, each node of the output layer 430 outputs, as a score, the probability that the malicious code included in the suspicious data belongs to the category of the malicious code.

Next, in step S230, the detection unit 300 determines that the malicious code included in the suspicious data, belongs to the category of the malicious code corresponding to the node having the maximum output value among the respective nodes of the output layer 430, and outputs the category of the malicious code.

Meanwhile, the above-described method according to the embodiment of the present invention may be implemented in a program command form which may be performed through various means for processing information to be recorded in a storage medium. Herein, the storage medium may include program commands, data files, data structures, and the like alone or in combination thereof. The program command recorded in the storage medium may be specially designed and configured for the present invention, or may be publicly known to and used by those skilled in the software field. Examples of the storage medium include magnetic media such as a hard disk, a floppy disk, and a magnetic tape, optical media such as a CD-ROM and a DVD, magneto-optical media such as a floptical disk, and a hardware device which is specifically configured to store and examples of the program command such as a ROM, a RAM, a flash memory and the like. An example of the program command includes a high-level language code executable by a device electrically processing information, for example, a computer by using an interpreter, and the like, as well as a machine language code created by a compiler. The hardware device may be configured to be operated with one or more software modules in order to perform the operation of the present invention, and an opposite situation thereof is available.

While the present invention has been described with reference to several preferred embodiments, the present invention is not limited to the above-described exemplary embodiments, and it will be understood by those skilled in the art that various modifications and variations may be made within the detailed description of the invention and accompanying drawings without departing from the scope of the present invention as defined by the appended claims, as well as these modifications and variations should be included in the scope of the present invention according to doctrine of equivalents.

DESCRIPTION OF REFERENCE NUMERALS

100: Data conversion unit
200: Learning unit
300: Detection unit
400: Neural network
410: Input layer
420: Hidden layer
430: Output layer

The invention claimed is:

1. An apparatus for detecting variants of malicious code, comprising:
 a neural network comprising an input layer which includes a two-dimensional matrix, a hidden layer which includes a plurality of layers including a plurality of operations, wherein any one of operation results of any one of the plurality of layers is provided to and used in an operation of a subsequent layer as an input by giving weights, and an output layer which includes a plurality of nodes;
 a data converter configured to receive data including one-dimensional binary codes, and to convert the data, which includes generating pixels by dividing the received one-dimensional binary codes, and generating an image using the generated pixels to fit a size of the matrix of the input layer; and a detector configured to detect suspicious data in the converted data and transmit the suspicious data to the neural network as an input of the suspicious data to the neural network, to use the neural network to extract and classify features of the malicious code from the suspicious data, and to detect a category of the malicious code included in the suspicious data.

2. The apparatus for detecting variants of malicious code according to claim 1, wherein the data converter converts the one-dimensional binary codes into two-dimensional vector sequences by dividing the binary codes into each integer multiple having a word size used in an architecture.

3. The apparatus for detecting variants of malicious code according to claim 1, wherein the converted data includes learning data, and further comprising a leaner configured to transmit learning data in the converted data to the neural network as an input of the learning data to the neural network, and correct the weight by using backpropagation algorithms so that output values output by performing a plurality of operations on the neural network are an expected value which represents a known malicious code category of the learning data.

4. The apparatus for detecting variants of malicious code according to claim 1, wherein the hidden layer comprises:
convolution layers which include a plurality of feature maps to which the suspicious data is mapped, and which are configured to extract features of the malicious code included in the suspicious data by performing operations with a kernel;
pooling layers which include a plurality of feature maps to which features of the extracted malicious code are mapped corresponding to the convolution layers, and which are configured to extract a sample of the features of the malicious code by performing operations with the kernel; and
a fully-connected layer which includes a plurality of nodes each representing the features of the malicious code.

5. A method for detecting variants of malicious code using a neural network comprising an input layer which includes a two-dimensional matrix, a hidden layer which includes a plurality of layers including a plurality of operations, wherein any one of operation results of any one of the plurality of layers is provided to and used in an operation of a subsequent layer as an input by giving weights, and an output layer which includes a plurality of nodes, the method for detecting variants of malicious code comprising:

inputting input data including one-dimensional binary codes to a data converter;
generating pixels by dividing the one-dimensional binary codes by the data converter, and converting, by the data converter, the binary codes of the data into an image having the same ratio as a row-column ratio of the matrix using the generated pixels; and
detecting suspicious data by a detector and transmitting the detected suspicious data from the detector to the neural network as an input of the suspicious data;
extracting features of the malicious code included in the suspicious data using the neural network, and
detecting a category of the malicious code included in the suspicious data according to the features of the malicious code.

6. The method for detecting variants of malicious code according to claim 5, wherein the converting the binary codes of the data into an image comprises converting, by the data converter, input data including one-dimensional binary sequences into two-dimensional vector sequences by dividing the binary sequences of the input data into each integer multiple having a word size used in an architecture.

7. The method for detecting variants of malicious code according to claim 5, wherein the converted data includes learning data, and further comprising transmitting learning data in the converted data to the neural network as an input of the learning data, and correcting the weight by using backpropagation algorithms so that output values output by performing a plurality of operations on the neural network are an expected value which represents the category of the known malicious code of the learning data.

8. The method for detecting variants of malicious code according to claim 5, wherein the extracting features of the malicious code included in the suspicious data comprises:
performing operations between a feature map to which the suspicious data is mapped and a kernel;
mapping features of the extracted features of the malicious code to a plurality of nodes each representing the features of the malicious code; and
mapping the mapped features of the malicious code to a plurality of nodes each representing a category of the malicious code to output the same.

9. A non-transitory computer readable recording medium storing a program for performing the method for detecting variants of malicious code according to claim 5.

* * * * *